US006836846B1

United States Patent
Kanevsky et al.

(10) Patent No.: US 6,836,846 B1
(45) Date of Patent: Dec. 28, 2004

(54) METHOD AND APPARATUS FOR CONTROLLING E-MAIL ACCESS

(75) Inventors: Dimitri Kanevsky, Ossining, NY (US); Mariusz Sabath, Scarsdale, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,196

(22) Filed: Oct. 21, 1999

(51) Int. Cl.[7] .............................................. H04L 9/32
(52) U.S. Cl. .......................... 713/193; 707/10; 707/9
(58) Field of Search .......................... 713/193, 201; 707/10, 9; 705/54

(56) References Cited

U.S. PATENT DOCUMENTS 6,314,409 B2 * 11/2001 Schneck et al. ............... 705/54
6,591,367 B1 * 7/2003 Kobata et al. ............... 713/201

* cited by examiner

Primary Examiner—Steven Fischman
Assistant Examiner—Thanhnga Truong
(74) Attorney, Agent, or Firm—Scully, Scott, Murphy & Presser; Daniel P. Morris, Esq.

(57) ABSTRACT

A system for controlling access to electronic information packages including e-mail messages communicated from a sending device to a receiving device at one or more destination locations. The system and method includes determining fulfillment of one or more certain conditions at the destination location; and, implementing control in response to detection of a fulfilled one or more certain conditions to enable access to content provided in a communicated package. The access includes enabling a user to perform certain operations on the package content at the destination location, or, preventing certain operations from being performed. A mechanism is included for enabling automatic destruction of the e-mail messages immediately after being read by an authorized recipient, or, after a predetermined time interval from receipt of the message. A verification system is employed enabling a sender to verify users attempting to access the e-mail.

50 Claims, 4 Drawing Sheets

METHOD AND APPARATUS FOR CONTROLLING E-MAIL ACCESS

BACKGROUND OF THE INVENTION

1. Field of the Invention

The present invention relates generally to e-mail messaging systems, and, particularly, to a system and methodology for controlling access to e-mail data content present in e-mail messages.

2. Discussion of the Prior Art

Senders of E-mail messages often want the message to be retrieved and accessed by the intended recipient and not made available to anybody else to access. For example, a sender of an e-mail message including content of an intimate or personal nature would like to prevent a receiving user from showing his/her note to other people. Standard prevention methods that include encryption only helps to prevent unauthorized access to data while it is being communicated over the communication medium, e.g., phone lines. These security methods however, cannot prevent improper use of messages at a receiving end after they are decrypted.

It would thus be highly desirable to provide a system and method that enables a sender to control access to e-mail data after sending the e-mail message to the intended recipient.

SUMMARY OF THE INVENTION

It is an object of the present invention to provide a system and method for enabling a sender to control access to e-mail and electronic information content after sending the e-mail message to an intended recipient.

According to a preferred embodiment of the invention, there is provided a system and method for controlling access to electronic information packages including e-mail messages communicated from a sending device to a device at one or more destination locations. The system and method includes determining fulfillment of one or more conditions at the destination location; and, implementing controls in response to detection of a fulfilled one or more conditions to enable access to content provided in a communicated package. The access includes enabling a user to perform certain operations (e.g., playing, displaying) on the package content at the destination location, or, preventing certain operations from being performed (e.g., copying, saving). A mechanism is included for enabling automatic destruction of the e-mail messages immediately after being read by an authorized recipient, or, after a predetermined time interval from receipt of the message. A verification system is additionally employed enabling a sender to verify and authenticate users attempting to access the e-mail at the destination location prior to authorizing use or playback of the e-mail message.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
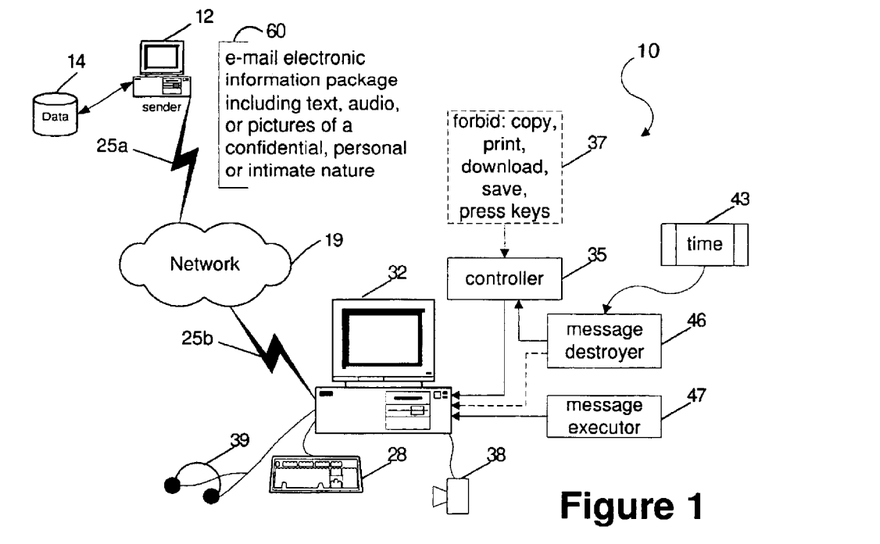
FIG. 1 is a general block diagram depicting the system for controlling e-mail access by senders.

FIG. 1 is a general block diagram depicting the system 10 for controlling e-mail access by senders. As shown in FIG. 1, the system implements electronic devices for sending one or several electronic information packages 60 from one or several computer devices 12 at originating locations through communication channels 25a,b, such as telephone channels, wireless channels, radio links for delivery over a network, e.g., the Internet 19, to one or several computer devices 32 at destination locations. In the preferred embodiment, "electronic information packages" αinclude one or more of the following data types: e-mail messages, audio data, video data, animation data, textual data, pictorial data, which may include content of a confidential, personal, or intimate type. It is understood that an electronic information package may include any other types of data content, i.e., of a non-personal nature. According to the invention, the system enables access to these packages at the destination points and controls access to these packages at destination points by allowing or forbidding certain operations to be performed on these packages at these destination points in accordance with predetermined conditions. That is, only if certain predetermined conditions at these destination points are fulfilled, access to or destruction of these information packages is enabled.

It is understood that computer devices 12, 32 at originating and destination locations are devices that comprise CPU and memory storage devices. (not shown) however, such devices 12, 32 may include: laptop/notebook computers, embedded devices, and consumer electronics (kitchen appliances, TV, electronic gadgets, palmtops, and telephones). Further, as shown in FIG. 1, the sending terminal will include a memory or database storage device 14 comprising recipient verification/authentication data accessible by the sender as will be described herein.

As shown in FIG. 1, the computer device 32 at the destination location includes a modified e-mail program or executor 47 for retrieving and notifying a recipient of a retrieved message. The recipient computer device 32 further includes a controller module 35 implementing software controls for preventing certain operations 37 from being performed on received electronic information packages in accordance with the invention as discussed herein. Such controls include the satisfaction and/or determination of one or more certain conditions, as will be described in greater detail herein. Particularly, the controller module 35 permits or prevents one or more of the following operations to be performed on the received electronic information packages: a saving operation for saving these packages in memory storage devices at destination points; a transfer operation such as copying, printing, storing or downloading of these packages and data to memory storage devices; a displaying operation for video data, text, picture and animation data on one or several display devices (not shown) at destination points; and, playing audio data on one or several audio playback/speaker devices 38 at destination points (as shown in FIG. 1). It is understood that other operations such as the destruction of the received electronic package may be enabled or prevented by controller module 35. Alternately, the electronic information package itself may be equipped with a program that is capable to control access to its content and destroy these packages when certain conditions are fulfilled. Thus, for instance, a sender system may be equipped with a program that is capable of controlling access to its content and destroy these packages when the certain conditions are fulfilled.

In a preferred embodiment, an electronic information package may be automatically destructed at the destination computer terminal 32 at a pre-determined time after it is received. Thus, as shown in FIG. 1, a message destroyer process 46 which may be executing as part of the controller module, or separately therefrom, implements a timer mechanism 43 for determining time elapsed from receipt of the electronic information package at computer device 32. After one or more pre-determined time intervals has elapsed, the message destroyer mechanism 46 will automatically trigger a destruction operation in the computer terminal for deleting the electronic information package. According to the invention, the number of intervals and length of a time interval may be set by the sender of the message, for instance, as a parameter to be entered as part of the e-mail message. As will be described in greater detail herein, this parameter information is received as part of or, in addition to the e-mail message, and implemented by the message destroyer 46 and timer mechanisms at the destination device 32. The actual destruction operation may be performed by the controller module 35 separately from or, in conjunction with a particular computer operating system.

It is understood that other conditions may be satisfied for triggering the destruction of a received electronic information package at the destination computer terminal. The other conditions include, but are not limited to the following: a) the detection of someone or something trying to perform a forbidden operation on the received electronic information package at the computer device 32; b) the direct command from the e-mail sender to instruct the control module to destroy a message at a later point in time; c) the detection of a modification or change in the CPU; a change in memory amount, or memory modification; a modification to or change of a peripheral device implemented at computer devices at destination points that are not related to the process of displaying or playing information packages at destination points; and d) the detection of when a playback and/or display of information package content is completed at the destination computer device 32.

Preferably, the condition a) of detecting attempted performance of a forbidden operation on the received electronic information package at the computer device 32 may be specified by the sender and entered as a parameter in the e-mail message, or, as a data attached to the message. As mentioned herein, types of forbidden operations include: a saving operation for saving these packages in memory storage devices at destination points; and, a transfer operation such as copying, printing, storing or downloading of these packages and data to memory storage devices. In operation, the control module 35 either separately from or, in conjunction with the computer device's operating system, will detect such a forbidden operation attempt, and trigger the destroyer process 46 to destruct the received electronic information package. Similarly, as for condition b) the sender may additionally send a direct command via e-mail at a later point in time as a parameter in the e-mail message, or, as data or a program attached to the message in order to trigger the destroyer process 46 to destruct the received electronic information package.

Preferably, the condition c) of detecting a modification or change in the CPU or a change/modification of memory or peripheral device may be specified by the sender of the package and performed by the control module 35. Once such a condition is detected, the control module will trigger the destroyer process 46 to destruct the received electronic information package. Similarly, as for condition d) the control module 35 will trigger the destroyer process 46 to destruct the received electronic information package upon detection of a second or subsequent attempt to playback and/or display information package content at the computer device 32.

Still other conditions may be satisfied for triggering the destruction of a received electronic information package at the destination computer terminal. As shown in FIG. 1, the other conditions include, but are not limited to the following: e) the detection of one or several processes running in CPU or memory devices at destination points 32 that are related to process of copying, downloading, printing, or saving information packages, or, f) the detection of pressing a certain key on a keyboard device 28, the pressing of a button, or the attempted use of other input devices (e.g., a speech recognition device, or a pen-table) at destination locations. As described above with respect to conditions c) and d), the detection of conditions e) and f) are performed by the control module 35 in conjunction with the computer's operating system, which cooperatively functions to trigger the destroyer process 46 to destruct the received electronic information package at the receiver device 32.

In addition to specifying types of conditions for triggering the destruction of a received electronic information package at the destination computer terminal, the sender may specify one or more additional sets of conditions that must be satisfied for enabling the performance of certain operations on the received electronic information package at the destination location. As mentioned herein, types of permitted operations that may be performed include: but are not limited to, the following: a displaying operation for video data, text, picture and animation data on one or several display devices (not shown) at destination points; and, playing audio data on one or several audio playback/speaker devices 38 at destination points. The other conditions include, but are not limited to the following: g) a permission from the sender, e.g., entered as a parameter in the e-mail message, or, as a data or program attached to the message for use by the control module; and, h) the detection and identification of authorized user(s), for which access to these information packages is allowed; or, i) the detection or identification of other permissible electronic systems at destination locations that are trying to perform operations on the received electronic package content.

Figure 2:
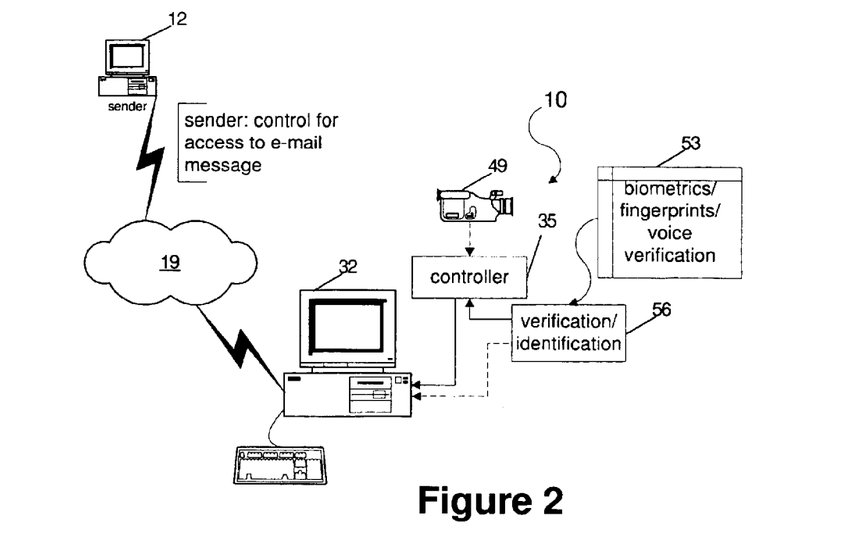
FIG. 2 is a diagram illustrating how a sender controls access to his/her message at a receiving computer terminal.

As depicted in FIG. 2, the condition h) of detecting and identifying authorized user(s) to accomplish the detection of an e-mail message, the computer device 32 at the destination location and the sending device may include the monitoring of user(s) via TV cameras or video camera devices 49 that are installed at destination points. For example, video device hardware/software devices, such as video camera 49, may be implemented to enable a sender 12 to observe users that request to read or play a content of information packages at destination points.

In a preferred embodiment, an electronic information package access operation may be enabled at the destination computer terminal 32 by implementation of a identification/authentication process 56 which executes locally as part of the controller module 35, or remotely therefrom. The identification/authorization process 56 that enables users or systems to access information packages may be performed in accordance with one or more of the following methods: the presentation by a user of a "pid" (personal ID) and/or passwords; and, the presentation and verification of that user's biometrics, fingerprints, and/or voice. That is, the identification/authorization process 56 implements well known techniques for verifying user's biometrics, fingerprints, and/or detected voice patterns at computer device 32. Such techniques for verifying, identifying may include techniques such as described in commonly-owned, co-pending U.S. patent application Ser. No. 09/079,754 (YO998-033 (728-103), entitled APPARATUS AND METHODS FOR USER RECOGNITION EMPLOYING BEHAVIORAL PASSWORDS, the whole contents and disclosure of which is incorporated by reference as if fully set forth herein.

The control module 35 additionally enables systems to access information packages and/or systems that request to access information packages such as: a) systems at communication subroutines/switches that support transferring data along other communication channels to new destination points; b) automated systems that are capable to understand content of information packages to perform necessary operations that are required by these sent packages; and, c) robotic devices. Thus, the identification/authorization process 56 further includes a detection mechanism for identifying if systems that are trying to perform operations on the received electronic package content at destination points are permissible electronic systems. It is understood that the permissible electronic systems may be specified by a sender, e.g., entered as a parameter in the e-mail message, or, as a program attached to the message or information package.

Figure 3:
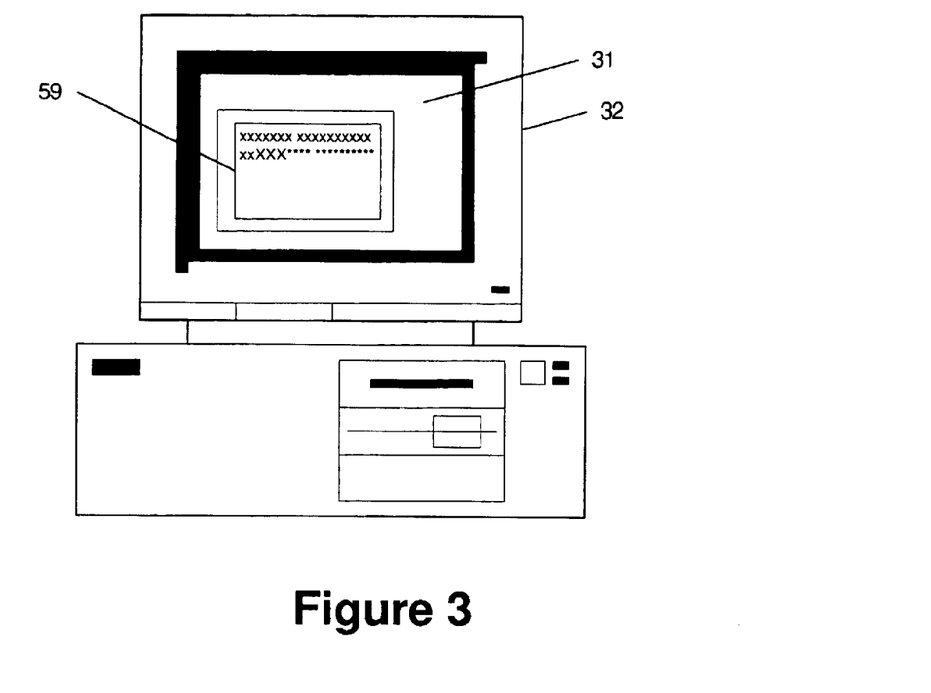
FIG. 3 is an illustration depicting the window shell e-mail message according to the invention.

According to the invention, access to electronic information packages is provided on displays 31, or, via speakers 38 or telephone sets 39, as shown in FIG. 1. As shown in FIG. 3, electronic information packages comprising visual, text, image, and/or pictorial data are displayed through window shells 59 according to known e-mail format or GUI representations, such as provided by Lotus Notes, Netscape, Microsoft Outlook, Eudora, and the like. However, it is understood that the window shell 59 will only display e-mail message content and prevent any further operations from being performed (no printing, copying, etc.). For instance, textual and pictorial data in window shells 59 may _run from beginning of the data to the end (from one end of the window shell to another).

Figure 4:
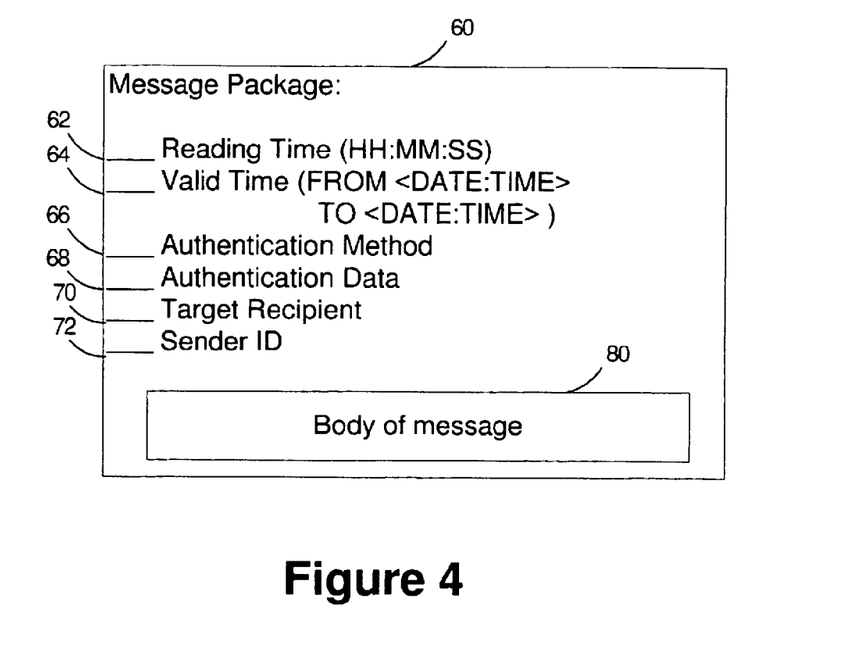
FIG. 4 is an illustration depicting the electronic information package to be sent by the sender.

In accordance with the invention as illustrated in FIG. 4, an electronic information package 60 may comprise one or more of the following fields: 1) a reading time field 62 having a data structure which specifies the time in hours, minutes and seconds (HH:MM:SS) for when the message content is to be displayed or available for the recipient; 2) a Valid time interval field 64 (from <date:time> to <date:time>) which specifies the time range during which the message content may be read, i.e., if it is accessed before the specified time, the message will not be available, if expired, it will be automatically destroyed; 3) an authentication method field 66 which includes a description of the method implemented (either remotely or locally) for authenticating the recipient/user; 4) authentication data field 68 which includes data used for the verification method implemented, e.g., voice pattern, fingerprint and other biometric data; 5) the target recipient(s) field 70 which specifies one or more recipients allowed to access the message and their e-mail addresses; 6) a Sender field 72 which includes information about the person/system that sends the message; and 7) the actual body of the message 80, i.e., electronic information content.

Figure 5A:
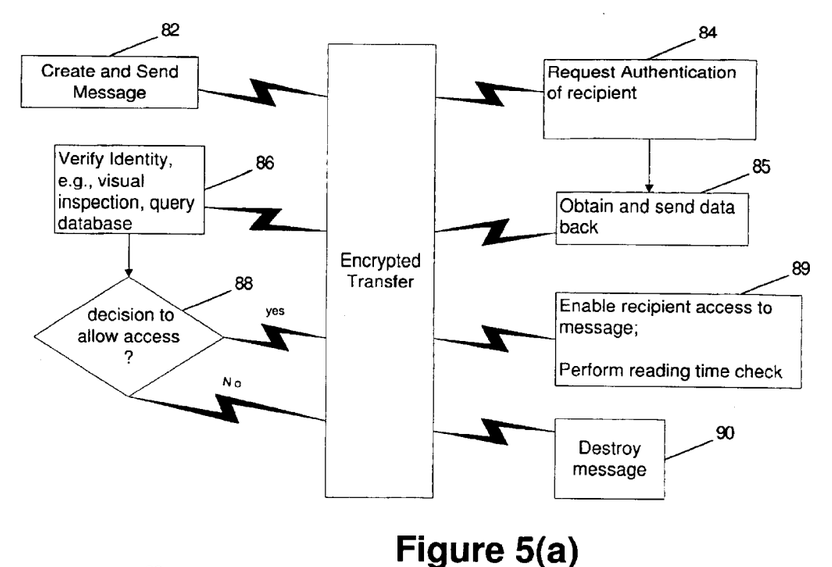
FIG. 5(a) is an illustration depicting the method implemented for remote authorization according to the invention.

The system for providing remote user authentication, according to the invention, is now described in view of FIG. 5(a). As shown in FIG. 5(a), at step 82, the message package is created on the sender system 12 and sent to the receiver terminal via communications channels 25. Preferably, the entire communication between the sending and receiving end-points is encrypted. At step 84, at the destination 32, the receiver device processes the authentication method field 66 from the message package 60 and determines the type of the authentication method and that the authentication is to be performed remotely. After obtaining data (e.g., by obtaining a user-entered userid or password, and/or a camera image, voice-print, or a finger-print scan, etc.), the collected information is communicated back to the sender device at step 85 for processing there. Then, at step 86, a verification of identity is be done by a query to the database 14 (FIG. 1), visual inspection (by the active video camera system (FIG. 2), or by using apparatus for user recognition according to techniques known in the prior art. When all the verification conditions are fulfilled, at step 88, the sender will either grant the access to the information by sending a message, or, otherwise it may send a request to destroy the message. If authentication is successful, the message package will be _available to the recipient for the period of time specified in Reading Time field 62 (FIG. 4), as indicated at step 89, otherwise it will be destroyed, as indicated at step 90.

Figure 5B:
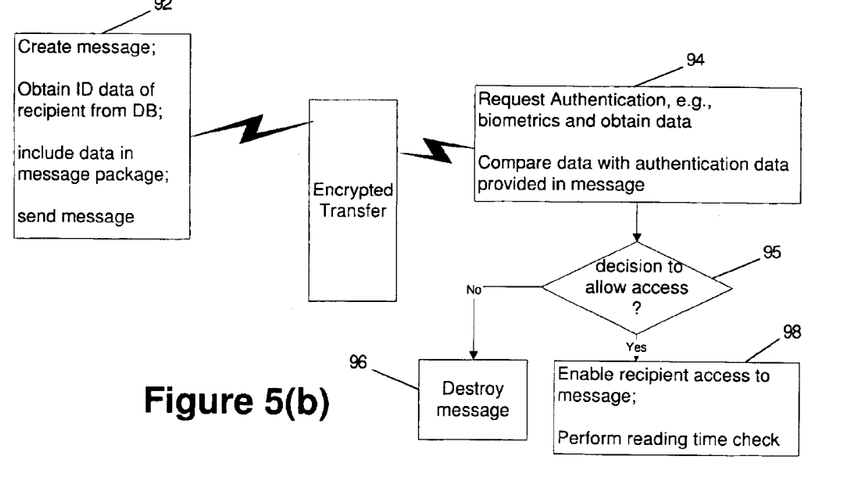
FIG. 5(b) is an illustration depicting the method implemented for local authorization according to the invention.

The system for providing local user authentication, according to the invention, is now described in view of FIG. 5(b). As shown in FIG. 5(b), at step 92, the message is created on the sender system 12. Further this step 92 requires determining a list of authorized recipient(s) and the authentication method, and the retrieval of authentication data from the database 14 (FIG. 1) at the sender terminal. Once all this information is determined and all the data required for authentication is packaged with the message in the Authentication Data field 68, the message is then sent to the recipient terminal where it is received at step 94. At step 94, the authentication takes place and the results are compared with the data from the Authentication Data field 68. A decision is made at step 95 to determine if the authentication was successful. If the authentication was successful, the message becomes available to the recipient for the period of time specified in reading time field at step 96, otherwise it is destroyed at step 98.

It should be understood that, local authentication is much faster then remote authentication, because, after the message is sent, it executes independent of the sender.

Figure 6:
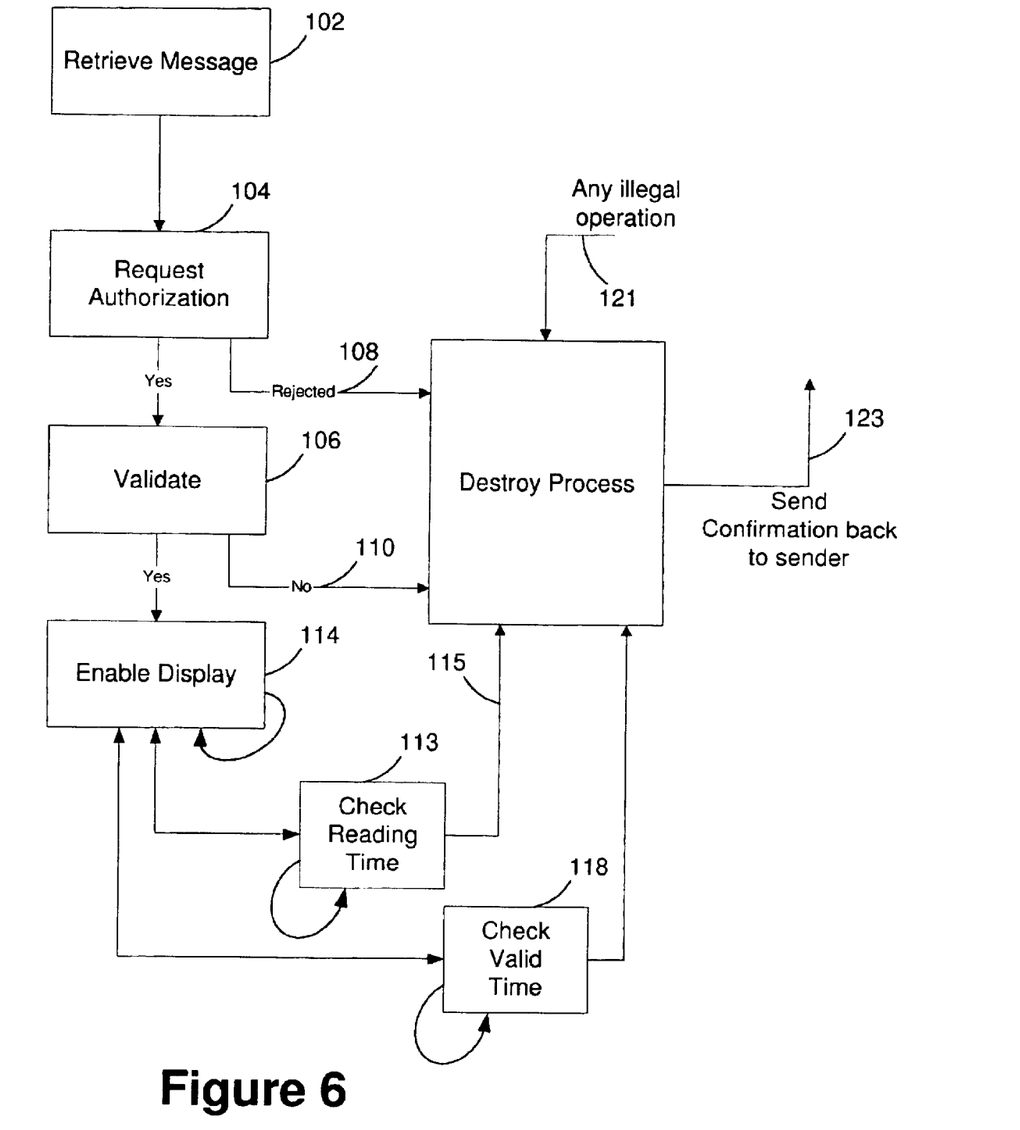
FIG. 6 is an illustration depicting the general workflow process performed at the receiver terminal.

FIG. 6 is a workflow diagram illustrating the method executed at the receiver device for controlling e-mail access of the invention. As indicated at a first step 102, the message package is received. Regardless of the type of the authentication specified in Authentication Method field 66, the receiver enables the authentication method at step 104 and compares the results with the data contained in Authentication Data field 68 of the received message, as indicated at step 106. If the authorization fails as indicated at 108, the destroy process is executed and the message content is destroyed. Likewise, if the validation fails as indicated at 110, the destroy process is executed. If the validation is accepted, the message content is available for display/playback. Once the message is displayed or played back, the reading time (HH:MM:SS) message field is checked and the timer mechanism invoked to enable display/playback of the message content for the specified time interval, as indicated at 118. If the reading message time has elapsed, as indicated at 115, the destroy process is executed and the message content destroyed. Likewise, the valid time interval is checked at 118 to determine if the recipient has accessed the message content within the valid time period indicated by the Valid time field 64 of the message. Once the valid time interval has elapsed as indicated at step 120, the message content is destroyed. Further, as shown in FIG. 6, any illegal operation 121 causes the message to be destroyed and the sender to be optionally notified at step 123. Thus, a message is available to the recipient only when successfully authenticated and only within the time period specified in Reading Time field.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for controlling access to electronic information packages communicated from a sending device to a device at one or more destination locations, said system comprising:

means for determining fulfillment of one or more certain conditions at said destination location, said means including means enabling a sender of a communicated package to visually observe a user requesting access to content at said destination location, said means including video monitoring system for generating video signals of users attempting to read or play information package content at a destination device and, a video monitoring system display device at said sending device for receiving and displaying said video signals, said condition including sender identification of an intended recipient by visual observation via said monitoring system display device; and, control means responsive to detection of a fulfilled one or more certain conditions for enabling access to content provided in a communicated package, whereby said access includes enabling said intended recipient to perform an operation on said package content at said destination location.

2. The system as claimed in claim 1, wherein said electronic information packages include content comprising one or more of: email messages, audio data, video data, animation data, textual data, and pictorial data.

3. The system as claimed in claim 2, further including means for automatically destroying a received electronic information package in response to detection of a fulfilled one or more certain conditions.

4. The system as claimed in claim 3, wherein a fulfilled one or more certain condition includes detection of one or more elapsed time intervals, said system further comprising means for determining elapsed time from receipt of an electronic information package, said means generating a signal for destroying the received electronic information package after a time interval has elapsed.

5. The system as claimed in claim 4, wherein said elapsed time interval is specified by a sender at said sending device, said electronic information package further comprising a specification of one or more time-out intervals for use by said elapsed timing means.

6. The system as claimed in claim S, wherein said operations enabled to be performed on said package content at said destination device include displaying one or more of video data, text, picture and animation data via a display device at said destination location.

7. The system as claimed in claim 5, wherein said operations enabled to be performed on said package content at said destination device include playing audio data on one or several speakers at said destination location.

8. The system as claimed in claim 3, wherein said access includes forbidding a user to perform an operation on said package content at said destination device, said operations that are forbidden to be performed on received information packages include one or more of:

saving, copying and downloading the received information package content in a memory storage device and printing said package content at said at a destination location.

9. The system as claimed in claim 8, wherein said means for determining fulfillment of one or more certain conditions at said destination device further comprises means for detecting an attempted performance of a forbidden operation at the destination location, said destroying means automatically destroying a received electronic information package in response to said detection.

10. The system as claimed in claim 9, wherein said means for detecting an attempted performance of a forbidden operation at the destination location, includes means operable in conjunction with an operating system at said destination device, for detecting invocation of one or several processes running in CPU or memory at said destination location that are related to one or more of: copying; downloading, printing, and saving, received electronic information packages.

11. The system as claimed in claim 9, wherein said means for detecting an attempted performance of a forbidden operation at the destination location, includes means operable in conjunction with an operating system at said destination device, for detecting a pressing of a key on a keyboard operable for said destination device.

12. The system as claimed in claim 8, wherein said means for determining fulfillment of one or more certain conditions at said destination device further includes means for receiving a direct command signal from a sender at a sending device, said sender command triggering destruction of said electronic information package.

13. The system as claimed in claim 8, wherein said means for determining fulfillment of one or more certain conditions at said destination device further comprises means for detecting changes in physical hardware devices that are not related to the process of displaying or playing information packages at destination locations, said physical hardware devices including CPU, memory or peripherals at said destination device, said destroying means automatically destroying a received electronic information package in response to said detection.

14. The system as claimed in claim 8, wherein said means for determining fulfillment of one or more certain conditions at said destination device further comprises means for detecting a second or repeated attempted to play or display information package content, said destroying means automatically destroying a received electronic information package in response to said detection.

15. The system as claimed in claim 1, wherein said means for determining fulfillment of one or more certain conditions at said destination location includes identification means for identifying a user at said destination location for which access to these information packages is allowed.

16. The system as claimed in claim 15, wherein said identification means for identifying a user at said destination location comprises:

means for enabling users to present a password to said system; and, verification means for verifying a user's password prior to enabling access to said information package.

17. The system as claimed in claim 15, wherein said identification means for identifying a user at said destination location comprises means for enabling users to present a data for authentification/verification that include one or more of the following: biometrics, fingerprint, and voice data.

18. The system as claimed in claim 1, wherein said means for determining fulfillment of one or more certain conditions at said destination location includes identification means for identifying an electronic system at said destination location for which access to these information packages is allowed.

19. The system as claimed in claim 18, wherein said electronic system trying to access information packages comprises a communication process that supports transferring electronic package content via a communication channel to new destination locations.

20. The system as claimed in claim 18, wherein said electronic system trying to access information packages comprises an automated process capable of understanding information package content and performing necessary operations as required for playing said content.

21. The system as claimed in claim 18, wherein said electronic system trying to access information packages comprises a robotic device.

22. The system as claimed in claim 1, wherein said electronic information packages communicated from a sending device to a device at one or more destination locations, is communicated over a communications channel including one or more of: telephone wires, wireless channels, radio links, network data connection.

23. A method for controlling access to electronic information packages communicated from a sending device to a device at one or more destination locations, said method comprising:
    implementing a video monitoring system for generating video signals of users attempting to read or play information package content at a destination device and, a video monitoring system display device at said sending device for receiving and displaying said video signals;
    determining fulfillment of one or more conditions at said destination location, said determining including enabling a sender of a communicated package to visually observe a user requesting access to content at said destination location and identify an intended recipient by visual observation via said monitoring system display device as a condition; and,
    in response to determination of a fulfilled one or more certain conditions, enabling access to content provided in a communicated package.

24. The method as claimed in claim 23, further including the step of automatically destroying a received electronic information package in response to detection of a fulfilled one or more certain conditions.

25. The method as claimed in claim 24, wherein a fulfilled one or more certain condition includes detection of one or more elapsed time intervals from receipt of an electronic package, said method further comprising the steps of:
    determining elapsed time from receipt of an electronic information package; and,
    generating a signal for initiating automatic destruction of the received electronic information package after said elapsed time interval.

26. The method as claimed in claim 25, further including the step of enabling a sender to specify said time interval.

27. The method as claimed in claim 23, wherein said step of enabling access to said content of said communicated package includes enabling a user to display one or more of video data, text, picture and animation data via a display device at said destination location, and play audio data on one or several speakers at said destination location.

28. The method as claimed in claim 27, wherein said step of enabling access to said content of said communicated package includes forbidding a user to perform an operation on said package content at said destination device, said operations forbidden to be performed on received information packages including one or more of: saving, copying and downloading the received information package content in a memory storage device and printing said package content at said at a destination location.

29. The method as claimed in claim 27, wherein said enabling step of determining fulfillment of one or more conditions at said destination device further comprises detecting an attempted performance of a forbidden operation at the destination location; and, in response to said detecting, automatically destroying a received electronic information package.

30. The method as claimed in claim 29, wherein said step of detecting an attempted performance of a forbidden operation at the destination location includes: detecting invocation of one or several processes running in CPU or memory at said destination location that are related to one or more of copying, downloading, printing, and saving, received electronic information packages.

31. The method as claimed in claim 29, wherein said step of detecting an attempted performance of a forbidden operation at the destination location includes: detecting a pressing of a key on a keyboard operable for said destination device.

32. The method as claimed in claim 27, wherein said step of determining fulfillment of one or more conditions at said destination device further includes: receiving a direct command signal from a sender at a sending device for initiating destruction of said electronic information package.

33. The method as claimed in claim 27, wherein said step of determining fulfillment of one or more conditions at said destination device further includes: detecting changes in physical hardware devices that are not related to the process of displaying or playing information packages at destination locations, said physical hardware devices including CPU, memory or peripherals at said destination device, and in response to said detecting, automatically destroying a received electronic information package.

34. The method as claimed in claim 27, wherein said step of determining fulfillment of one or more conditions at said destination device further includes: detecting a second or repeated attempted to play or display information package content, and in response to said detecting, automatically destroying a received electronic information package.

35. The method as claimed in claim 23, wherein said step of determining fulfillment of one or more certain conditions at said destination location includes the step of:
    identifying a user at said destination location for which access to these information packages is allowed.

36. The method as, claimed in claim 35, wherein sad identifying stop further includes:
    enabling users to present a password to said method; and,
    verifying a user's password prior to enabling access to said information package.

37. The method as claimed in claim 35, wherein said identifying step further includes authenticating said user by enabling users to present biometric data on/verification that include one or more of the following: biometrics, fingerprint, and voice data, said method including comparing input biometric data with predetermined biometric data corresponding to the intended recipient.

38. The method as claimed in claim 23, wherein said step of determining fulfillment of one or more conditions at said destination location includes identifying an electronic system at said destination location for which access to these information packages is allowed.

39. A program storage device readable by a machine, tangibly embodying a program of instructions executable by the machine to perform method steps for controlling access to electronic information packages communicated from a sending device to a device at one or more destination locations, said method steps comprising:

implementing a video monitoring system for generating video signals of users attempting to read or play information package content at a destination device and, a video monitoring system display device at said sending device for receiving and displaying said video signals, determining fulfillment of one or more conditions at said destination location, said determining including enabling a sender of a communicated package to visually observe a user requesting access to content at said destination location via said monitoring system display device and identify an intended recipient by visual observation via said monitoring system display device as a condition; and, in response to determination of a fulfilled one or more certain conditions, enabling access to content provided in a communicated package.

40. The program storage device as claimed in claim 39, further including the step of automatically destroying a received electronic information package in response to detection of a fulfilled one or more certain conditions.

41. The program storage device as claimed in claim 40, wherein a fulfilled one or more certain condition includes detection of one or more elapsed time intervals from receipt of an electronic package, said method further comprising the steps of:

determining elapsed time from receipt of an electronic information package; and, generating a signal for initiating automatic destruction of the received electronic information package after said elapsed time interval.

42. The program storage device as claimed in claim 41, wherein said step of determining fulfillment of one or more conditions at said destination device further comprises detecting an attempted performance of a forbidden operation at the destination location; and, in response to said detecting, automatically destroying a received electronic information package.

43. The program storage device as claimed in claim 41, wherein said step of determining fulfillment of one or more conditions at said destination device further includes:

receiving a direct command signal from a sender at a sending device for initiating destruction of said electronic information package.

44. The program storage device as claimed in claim 41, wherein said step of determining fulfillment of one or more conditions at said destination device further includes:

detecting changes in physical hardware devices that are not related to the process of displaying or playing information packages at destination locations, and in response to said detecting, automatically destroying a received electronic information package.

45. The program storage device as claimed in claim 41, wherein said step of determining fulfillment of one or more conditions at said destination device further includes:

detecting a second or repeated attempted to play or display information package content, and in response to said detecting, automatically destroying a received electronic information package.

46. The program storage device as claimed in claim 41, wherein said step of detecting an attempted performance of a forbidden operation at the destination location includes:

detecting invocation of one or several processes running in CPU or memory at said destination location that are related to one or more of: copying, downloading, printing, and saving, received electronic information packages.

47. The program storage device as claimed in claim 41, wherein said step of detecting an attempted performance of a forbidden operation at the destination location includes:

detecting a pressing of a key on a keyboard operable for said destination device.

48. The program storage device as claimed in claim 41, wherein said step of determining fulfillment of one or more certain conditions at said destination location includes the step of: identifying a user at said destination location for which access to these information packages is allowed.

49. The program storage device as claimed in claim 48, wherein said identifying step includes:

enabling users to present a password to said method; and, verifying a user's password prior to enabling access to said information package.

50. The program storage device as claimed in claim 48, wherein said identifying step includes authenticating said user by enabling users to present biometric data on/verification that include one or more of the following: biometrics, fingerprint, and voice data, said method including comparing input biometric data with predetermined biometric data corresponding to the intended recipient.

* * * * *